(No Model.)
F. A. BRUNDAGE.
FRUIT PAIL FOR GATHERING FRUIT.
No. 347,918. Patented Aug. 24, 1886.
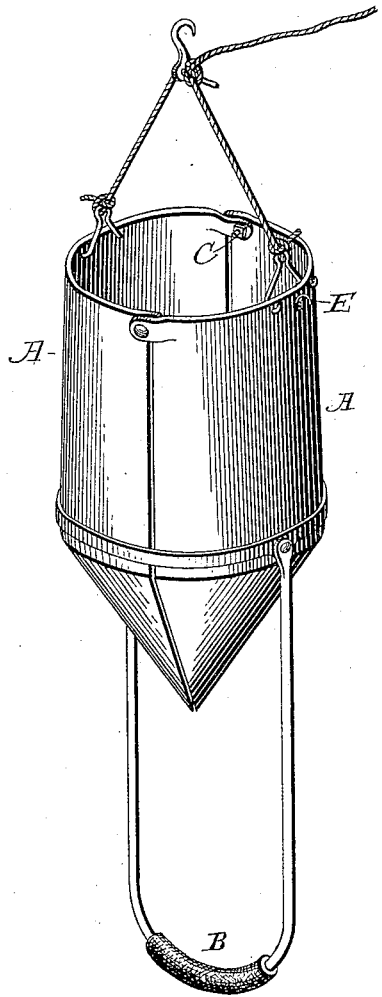
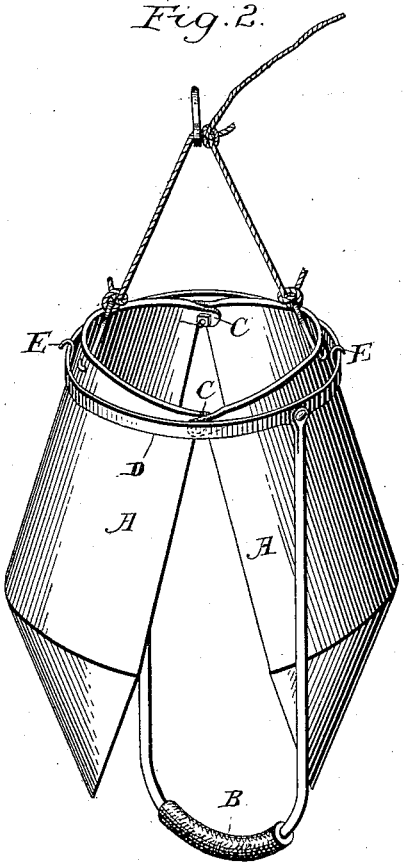
Witnesses:
Elba Reynolds
Alfred Brundage
Inventor:
Fred A Brundage
Frank Sheehy
Atty.

UNITED STATES PATENT OFFICE.

FRED. A. BRUNDAGE, OF BELMONT, NEW YORK.

FRUIT-PAIL FOR GATHERING FRUIT.

SPECIFICATION forming part of Letters Patent No. 347,918, dated August 24, 1886.

Application filed September 14, 1885. Serial No. 177,114. (No model.)

*To all whom it may concern:*

Be it known that I, FRED. A. BRUNDAGE, a citizen of the United States, residing at Belmont, in the county of Allegany and State of New York, have invented certain new and useful Improvements in Fruit-Pails, of which the following is a description.

This invention has relation to improvements in fruit-pails; and it consists in the construction, novel arrangement, and adaptation of devices, as will be hereinafter more fully set forth and claimed.

In the accompanying drawings, Figure 1 is a perspective view of my improved pail, showing the same in an operative position; and Fig. 2 is a similar view showing the pail in an open position.

Referring by letter to the said drawings, A indicates the pail, which may be formed of sheet metal or other suitable material. This pail is composed of two similar halves, which are hinged together at their upper ends, as shown at C, and converge at their lower ends in approximately the form of a half-cone. The upper ends of each section is provided with an ear or the like for attaching a suspension-cord, and these eyes are arranged diametrically opposite each other and preferably at right angles with a line drawn across the hinge-joints, the cord or rope being designed to suspend the pail, and so arranged as to raise and lower the same.

D indicates a slide-ring which is placed over the outside of the pail, and is designed to close the sections when the pail has been raised, the pail-sections being provided with a stop or hooks, E, to prevent the ring from passing over the said pail during the discharge of its contents. This ring is provided with a bail which is fixed at its opposite ends to the said ring and passes downwardly a sufficient distance beneath the pail, so that when the pail is let down and the bail strikes the earth or other substance the ring will be pressed up and the two sections of the pail allowed to separate and discharge the contents.

The lower portion of the bail F may be provided with a rubber tube, B, or wrapped with other material which will prevent the fruit from injury when discharged thereon.

Having described this invention, what I claim is—

1. A fruit-pail consisting of two hinged sections, a slide-ring for closing the same, and a bail or arm secured to the ring, whereby the sections may be opened when the pail is let down and the said arm engaged, substantially as specified.

2. The combination, with a fruit-pail composed of two hinged sections having lower converging ends, of a slide-ring for closing the sections, a bail secured to the ring for moving the same, and a covering for the said bail to prevent injury to the fruit, substantially as specified.

3. As an improved article of manufacture, a fruit-pail consisting of two similar sections tapering or converging at their lower ends, hinged together at their upper ends, provided with ears to receive a suspension-rope and external guard-hooks near their upper ends, an external slide-ring encircling the two sections for closing the same, a bail secured to the slide-ring and extending beneath the pail, and an elastic tubing on the bail, substantially as shown and described.

In witness whereof I have hereunto subscribed my name the 24th day of August, 1885.

FRED. A. BRUNDAGE.

Witnesses:
ELBA REYNOLDS,
ALFRED BRUNDAGE.